(12) United States Patent
Heuft

(10) Patent No.: US 6,430,991 B1
(45) Date of Patent: Aug. 13, 2002

(54) METHOD FOR MONITORING CLOSED CONTAINERS

(75) Inventor: Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 09/744,523

(22) PCT Filed: Jul. 29, 1999

(86) PCT No.: PCT/EP99/05532

§ 371 (c)(1),
(2), (4) Date: Jan. 25, 2001

(87) PCT Pub. No.: WO00/06985

PCT Pub. Date: Feb. 10, 2000

(30) Foreign Application Priority Data

Jul. 29, 1998 (DE) .......................................... 198 34 218

(51) Int. Cl.⁷ .......................... G01M 3/00; G01M 3/02; B07C 5/00
(52) U.S. Cl. .............................. 73/52; 73/579; 73/37.8; 209/529; 209/597
(58) Field of Search .......................... 73/52, 49.3, 49.8, 73/37.8, 579, 646, 659, 592; 209/524, 529, 597

(56) References Cited

U.S. PATENT DOCUMENTS 3,633,742 A * 1/1972 Melton ........................ 209/80
3,792,606 A * 2/1974 Munger ........................ 73/40
5,675,074 A * 10/1997 Melvin, II ..................... 73/52

FOREIGN PATENT DOCUMENTS

| DE | 4004965 | | 8/1991 | |
| DE | 4004965 A1 | * | 8/1991 | ............ G01M/7/00 |
| DE | 19646685 | | 5/1998 | |
| DE | 19646685 A1 | * | 5/1998 | ............ G01M/7/00 |

* cited by examiner

Primary Examiner—Hezron Williams
Assistant Examiner—Michael Cygan
(74) Attorney, Agent, or Firm—Gardner Carton & Douglas

(57) ABSTRACT

To test closed containers, e.g. with regard to residual air volume or the quality and tightness of the closures which are attached to containers, mechanical oscillations are excited in the closure, the mechanical oscillations are analyzed, measurement values are derived from this, these measurement values are compared with pre-set values for acceptable closures and a signal is produced which states whether the measurement value corresponds to a value for an acceptable closure. To increase the reliability of the test, the oscillation properties of the closure blanks (R) are also ascertained before their attachment to the containers (B) and the range of acceptable values of the closures (V) attached to the containers (B) is chosen according to the oscillation properties of the corresponding closure blank (R). The closure blanks (R) can be classified according to their oscillation properties.

4 Claims, 2 Drawing Sheets

METHOD FOR MONITORING CLOSED CONTAINERS

DESCRIPTION

The invention relates to a process for testing closed containers, e.g. the residual air volume or the quality and tightness of closures which are attached to containers, mechanical oscillations being excited in the closure, the mechanical oscillations being analyzed, measurement values being derived therefrom, these measurement values being compared with pre-set values for acceptable closures and a signal being produced which indicates whether the measurement value corresponds to a value for an acceptable closure.

It is known from DE-A-40 04 965 to test negative-pressure resilient-cap closures, in particular negative-pressure screw-closures, for the tightness of their attachment by producing mechanical oscillations in the top, processing and evaluating the oscillations with regard to their frequency, their period duration and/or attenuation and determining therefrom the level of the negative pressure in the container.

A similar process for measuring the internal pressure of a closed container is known from U.S. Pat. No. 5,353,631, a wall of the container being impacted, the oscillation spectrum of the mechanical oscillations produced thereby being recorded and being compared with the previously recorded oscillation spectrum of containers with known internal pressures.

In practice, problems arise from the fact that a drinks-filling operation obtains the blanks for screw closures or crown-cap closures from various manufacturers and the blanks of individual manufacturers differ from each other in material composition or thickness or in the compound attached to the inside of the closure. Such differences can also occur between different batches from the same manufacturer. As a result of these deviations, a particular measurement frequency for closures from one manufacturer can lie in an acceptable range, but lie in an unacceptable range for those of a different manufacturer, so that often no reliable statement about a closure is possible.

The object of the invention is to improve the reliability of the process named at the outset for testing container closures.

This object is achieved according to the invention in that the mechanical oscillation properties of the closures are ascertained additionally before their attachment to the containers and in that the acceptable range of values which are ascertained after the attachment of the closures to the containers is chosen according to the oscillation properties which were ascertained before the attachment of the closures.

By means of the first test of the closures which takes place before the attachment of the closures, which are still closure blanks, the material thickness can for example be ascertained by frequency measurement or the thickness of the compound layer by measuring the attenuation. It has been shown that closures which are manufactured with blanks which have the same material thickness, material composition, thickness of compound etc. deliver measurement values in the second test which scatter in only a very narrow range when the closure sits correctly, the container internal pressure, the fill level height etc. are correct. Difficulties which arise in practice from the fact that the closure blanks differ from each other can be dealt with by initially examining the properties of the closure blanks in a first test which takes place before the attachment of the closures to the containers. It is sufficient for this purpose to ascertain the oscillation properties of the blanks, e.g. the frequency of the mechanical oscillation and its attenuation. Using value tables in which the oscillation features ascertained before and after the attachment of the closures are allocated to each other, a very narrow range of acceptable measurement values can then be specified for a greater number of closures which differ from each other.

In principle, two versions of the process according to the invention are possible:

In the first version, it is assumed that a limited number, e.g. four, different types of closure blanks are involved. The first test of the closures is therefore carried out only with aim of ascertaining the type of the respective closure concerned. In the second test, carried out after the attachment of the closure, it is then ascertained whether the closure concerned has oscillation values within the range of acceptable values valid for this type.

In the case of the second version, oscillation features determined during the first test of the closure blank, e.g. the natural frequency and the time integral of the amplitude, are measured. For the second measurement, the acceptable values or value ranges are then chosen according to the values measured during the first test, e.g. a frequency increase between 10 and 20% or frequency shift of 500 Hz and a 30% reduction in the time integral of the amplitude. A previously empirically determined correlation is produced between the values of the first measurement and those of the second measurement.

Both versions can also be combined in such a way that, during the first test, the closure blanks are distinguished according to different types and then a determined correlation between the measurement values of the first and the second test is then applied for each type.

The process according to the invention is particularly suitable for refining the process described in the earlier application DE 197 36 869.7, in particular for determining the air volume and thus the residual oxygen in the drinks bottles. This test is important above all for beer. In the case of the process described in the earlier application DE 197 36 869.7, the analysis of the mechanical oscillations is carried out directly after the attachment of the closure before a significant change in the internal pressure takes place in the container. This oscillation analysis is the second test in the case of the process according to the invention.

The process according to the invention can also be used however for test processes in which the mechanical oscillations are analyzed and evaluated only after a certain period of time after the attachment of the closure. A precondition for this is that the path of a closure and bottle to which it is attached can be tracked. For this, there are known processes as used to track a bottle from an inspection device to a diversion device.

In particular when testing a closure for tight fit, it is expedient to carry out the second test or an additional test at some time after the attachment of the closure in order to be able to ascertain a drop in pressure that has occurred in the meantime. It may e.g. be necessary to measure the internal pressure before and after pasteurization of the container's contents. In a pasteurization apparatus, there are a very large number of containers in unordered sequence. To still be able to identify the containers, these must be marked. For this, the closures or the closed bottles must be provided with a marking in print or in bar code. This marking may be visible or for example detectable only under UV light. A magnetic marking as described in the simultaneously filed international patent application "Verfahren zum Prüfen von Behälterverschlüssen" [Process for testing container closures] (=DE patent application 198 34 185.7) is particularly suitable.

The process according to the invention is suitable both for crown caps which are crimped and for screw closures the screw thread of which is first shaped by rolling, and for twist-off closures and for can tops. Devices for attaching closures to drinks bottles, so-called closers, consist in general of several closing organs, e.g. crimping or rolling organs. It was ascertained that the individual closing organs differ slightly from each other in their mode of operation and produce closures with different values for relaxation time, energy and the frequency of the oscillation pattern, as is described in the earlier application DE 197 36 869 mentioned above. Preferably, individual value tables or correlation values are therefore used for each closing organ.

An embodiment of the invention is explained in the following using the drawing. It is shown in:

DETAILED DESCRIPTION OF THE INVENTION

Figure 1:
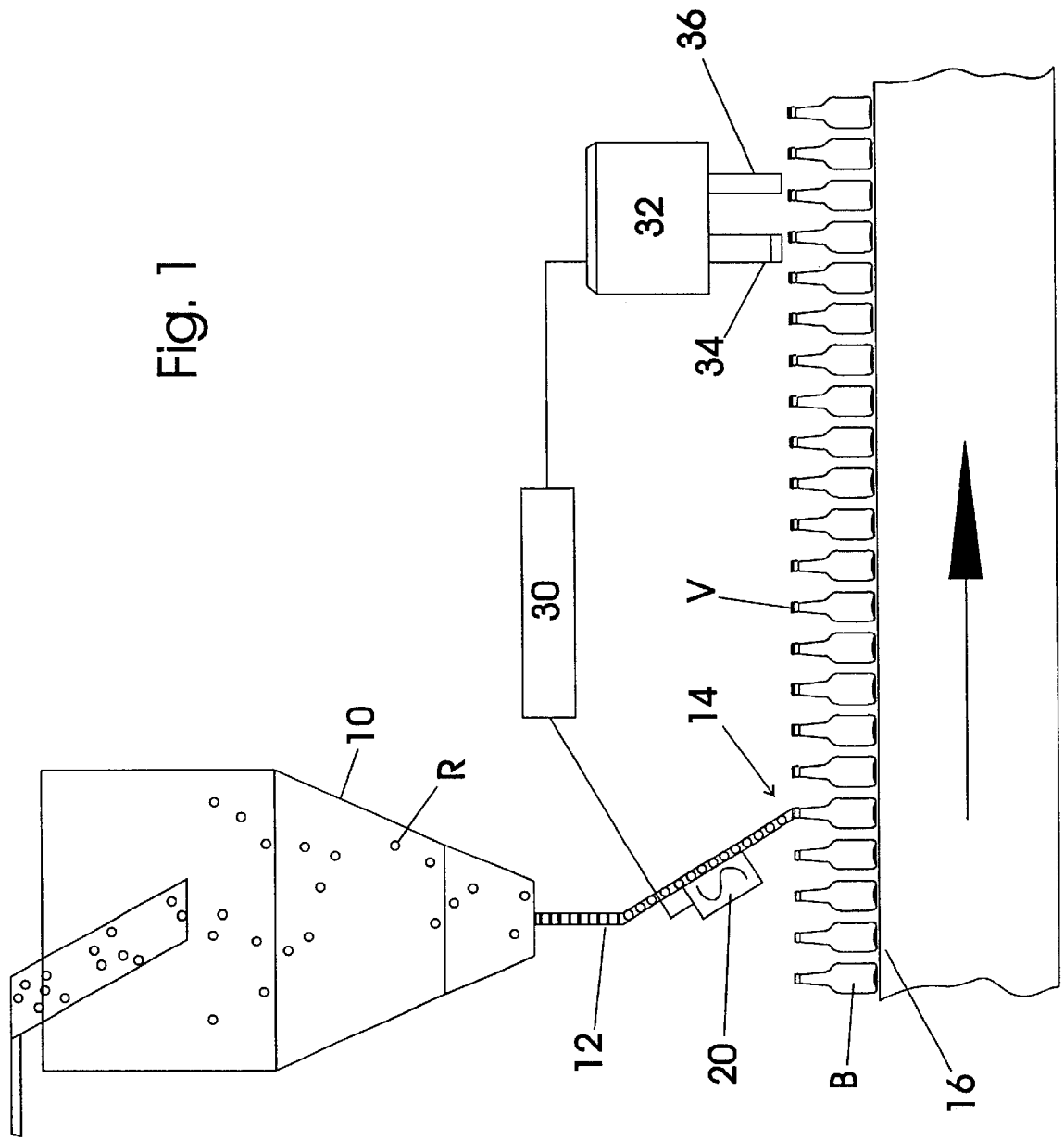
FIG. 1 a device for testing container closures in a schematic representation.
Figure 2:
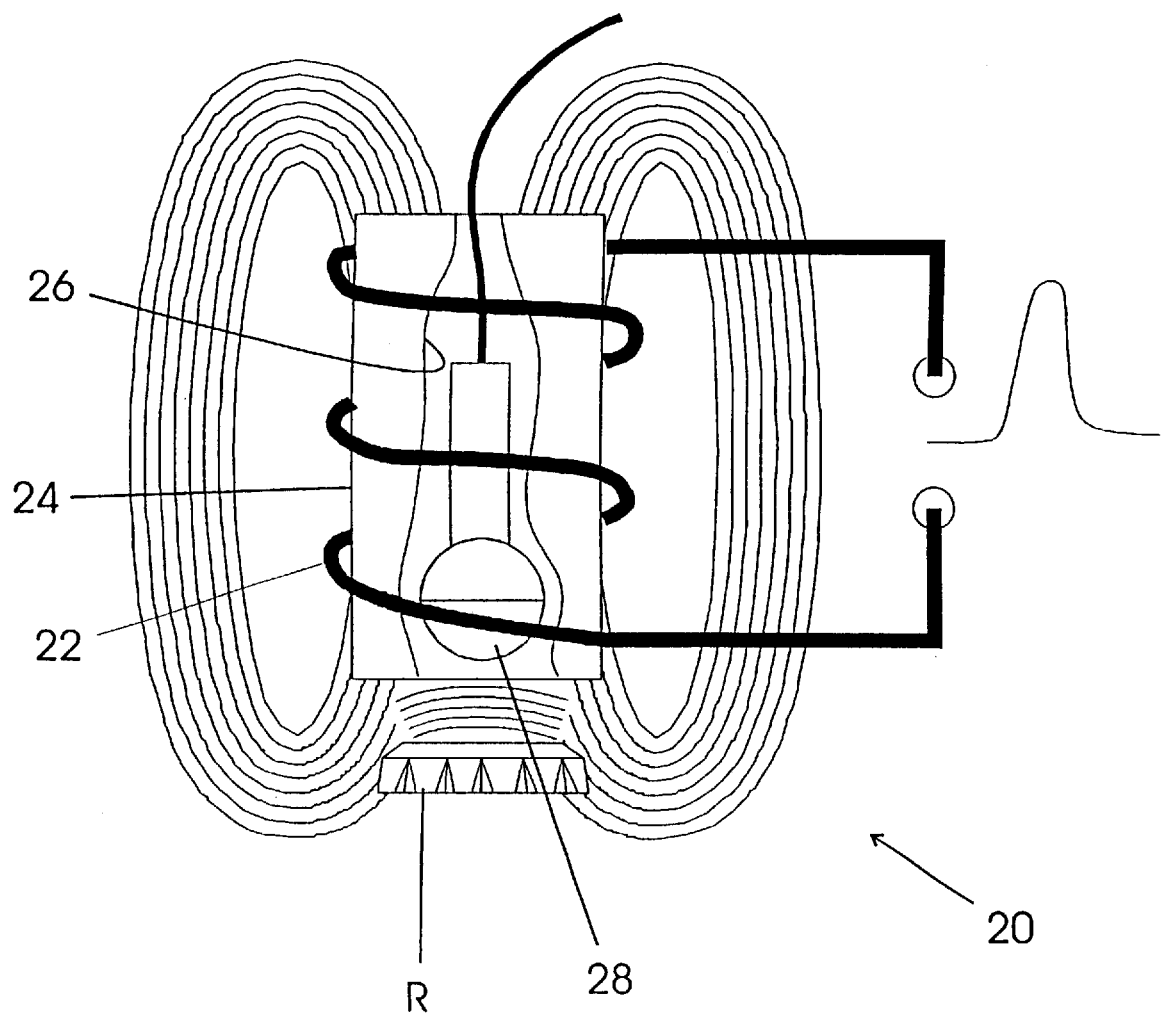
FIG. 2 a testing apparatus for closure blanks.

The closure blanks R, which are crown-cap closures in this case, are placed in a vibration funnel 10 which is of known design and therefore not described in more detail. The individual closure blanks R pass from the vibration funnel 10 onto a feed chute 12 on which they are fed to a closing device 14. The closing device 14 has several, e.g. twenty, closing organs for simultaneous closing of a corresponding number of containers B, which are 0.5 l drinks bottles in this case. The closing device 14 is likewise of customary design and is therefore not described in more detail.

While the closure blanks R are moved on the feed chute 12 to the closing device 14, they are tested by means of a first testing apparatus 20. The testing apparatus 20 contains a magnetic coil 22 the axis of which is perpendicular to the plane of the closure blank R. The magnetic coil 22 contains a core 24 with an axial bore 26 at the end of which facing the closure blank R a microphone 28 is arranged. Such a testing apparatus is known from DE-A-196 46 685. By means of a short magnetic pulse generated by the magnetic coil 22, a mechanical oscillation is triggered in the closure blank R which is recorded by the microphone 28. The oscillation signal recorded by the microphone 28 is analyzed in a manner known per se with regard to frequency, amplitude, attenuation and energy content, i.e. the time integral of the amplitude. The result of the analysis of the closure blank R is passed to a computer 30.

After the analysis, the closure blanks are attached to the containers B in the closing device 14. The containers B are transported on a transport belt 16, e.g. a link chain conveyor and, after the closing device 14, reach a second testing apparatus 32 which correspond in arrangement and design to the measuring apparatus described in DE-A-196 46 685 and DE-A-197 36 869. By means of the second testing device 32, the oscillation values of the closures V which are attached to the containers B are ascertained. The testing apparatus 32 contains apparatuses for monitoring pressure 34 and for monitoring fill level 36.

The signals of the first and second testing apparatus 20, 32 are processed in the computer 30 which controls an ejector, not shown, to separate out containers B which are insufficiently filled, or have a leaky closure V or other ascertained errors from the stream of containers B.

The signals obtained from the first testing apparatus 20 serve to ascertain the properties of the closure blank R. Slight deviations in the material thickness or the thickness of the compound influence the frequency or attenuation of the oscillation triggered by a magnetic pulse in the closure blank R by means of the first testing apparatus 20 and the attached closure V by means of the second testing apparatus 32.

In a first variant of the signal processing, it is assumed that a drinks-filling plant obtains closure blanks R from a particular number of manufacturers, for example four, and that the closure blanks R of each manufacturer have essentially uniform properties. It is sufficient in such a case to classify the closure blanks R accordingly. As the closures of one class have essentially the same features, the measurement values obtained in the second test which relate to closures within the same class and only good or acceptable closures scatter only very little. Poor or unacceptable closures can thereby be detected in the second test with a high degree of certainty.

Naturally, it is necessary to provide a coordination between the first and the second test by tracking the further path of each closure blank R after the first test, so that the computer knows, during the second test of an attached closure V, how the closure blank R concerned was classified in the first test. This tracking of the path of each closure blank R can be carried out using the known number of closure blanks between the first testing apparatus 20, within the closing device 14, the operating cycle of the closing device 14 and the known number of containers between the closing device 14 and the second testing apparatus 32. Alternatively, or as a support, the path of the closure blanks R and the attached closures V can be tracked by means of a CCD camera.

A further possibility for processing the measurement signals is to correlate a specified measurement value of the first test, e.g. the frequency of the fundamental oscillation of the closure blank R with the frequency of the fundamental oscillation of the attached closure V in that, e.g. the range of acceptable values of the frequency of an attached closure V must be higher by a factor of 1.3 to 1.35 than the frequency of the corresponding closure blank R. This correlation can also be multi-dimensional, incorporating the amplitude, the oscillation attenuation or the energy content of the oscillation.

Both processes can also be combined so that the closure blanks are classified and in addition any slight deviations within each class of closure blanks R are taken into account by a correlation of the measurement values obtained during the first and second test, and the scatter band of the acceptable values is thereby further reduced.

A customary closing device contains several, e.g. twenty closing organs. The individual closing organs attach the closures to the containers with a closure force which differs somewhat. Acceptable closures can therefore be attached to the containers with different degrees of firmness. This also leads to a scattering of the measurement values obtained in the second test. The slightly differing operation of the individual closing organs can likewise be taken into account in the evaluation of the measurement values obtained during the second test, whereby the scatter band of the acceptable values can be further narrowed. In addition to the classification of the closure blanks R and/or the parameter field which correlates the measurement values of the first and second test, the closing organ which attached this closure V can therefore also be taken into account.

A possible procedure when testing the tightness of the attached closure V is to wait for as long as possible a period after closing, so that the pressure within containers B with leaky closures V falls as clearly as possible. If fruit juices are pasteurized after closing for example, it is advisable to measure the internal pressure of the containers after pasteurization. For pasteurization, the containers B pass through the pasteurization apparatus unordered and slowly within for example 30 minutes. In order to be able to allocate the measurement values obtained in the second test after the pasteurization to those ascertained during the classification in the first test before the closing device 14, or other measurement values of the closure blank R concerned, it is then necessary to mark the closure blanks R, closures V or containers B. This marking can be carried out using visible or invisible ink. A particularly preferred process is the process for magnetic marking of container closures, described in the simultaneously filed international patent application "Verfahren zum Prüfen von Verschlüssen" (=DE patent application 198 34 185.7).

What is claimed is:

1. A process for testing closed containers, the process comprising the following steps:

ascertaining the oscillation properties of the closure blanks before their attachment to the containers;

ascertaining values of the oscillation properties of the closures attached to the containers;

choosing ranges of acceptable values of the closures attached to the containers according to the oscillation properties of the corresponding closure blanks;

comparing the ascertained values of the oscillation properties of the closures attached to the containers with the chosen ranges for acceptable values; and generating a signal which indicates whether the ascertained values of the oscillation properties of the closures attached to the containers lie within or outside the range of acceptable values.

2. The process according to claim 1, wherein the closure blanks are classified according to their oscillation properties.

3. The process according to claim 2, wherein the range of acceptable values of the oscillation values of the closures attached to the containers is correlated to the values of the oscillation properties of the closure blanks ascertained before their attachment to the containers and additionally to the classification of the closure blanks.

4. The process according to claims 1, 2 or 3, in which a closing device with several closing elements is used and an individual range of acceptable values is used for each closing element for the step of comparing the ascertained values of the oscillation properties of the closures attached to the containers with the chosen ranges for acceptable values.

* * * * *